(12) United States Patent
Jonsson et al.

(10) Patent No.: US 9,527,011 B2
(45) Date of Patent: Dec. 27, 2016

(54) METHOD FOR REMOVING POLYCYCLIC AROMATIC HYDROCARBONS

(75) Inventors: Stig Jonsson, Lund (SE); Staffan Bergstrom, Staffanstorp (SE); Johan Billing, Lund (SE)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 920 days.

(21) Appl. No.: 13/001,023

(22) PCT Filed: Jun. 26, 2009

(86) PCT No.: PCT/GB2009/050740
§ 371 (c)(1),
(2), (4) Date: Mar. 18, 2011

(87) PCT Pub. No.: WO2009/156763
PCT Pub. Date: Dec. 30, 2009

(65) Prior Publication Data
US 2011/0159160 A1 Jun. 30, 2011

(30) Foreign Application Priority Data
Jun. 27, 2008 (EP) .................................. 08159224

(51) Int. Cl.
*A24B 15/24* (2006.01)
*A24B 15/26* (2006.01)
*C12H 1/04* (2006.01)
*B01D 15/04* (2006.01)
*B01D 15/38* (2006.01)
*B01J 20/26* (2006.01)

(52) U.S. Cl.
CPC ........... *B01D 15/3852* (2013.01); *A24B 15/24* (2013.01); *A24B 15/246* (2013.01); *A24B 15/26* (2013.01); *B01J 20/26* (2013.01); *B01J 20/268* (2013.01); *Y02C 10/08* (2013.01)

(58) Field of Classification Search
CPC ....... A24B 15/24; A24B 15/246; A24B 15/26; B01J 20/26; B01J 15/3852; Y02C 10/08
USPC .......... 426/442; 131/297, 298; 210/690, 638
See application file for complete search history.

(56) References Cited

PUBLICATIONS

Dickert, F. L. et al., "Molecularly Imprinted Sensor Layers for the Detection of Polycyclic aromatic Hydrocarbons in Water," Analytical Chemistry, American Chemical Society, Columbus, US, vol. 71, No. 20, Oct. 15, 1999.*
Lai J. P., et al., "Benzo[a]pyrene imprinted polymers: synthesis, characterization and SPE application in water and coffee samples", Analytica Chimica Acta, Elsevier, Amsterdam, NL, vol. 522, No. 2, Sep. 27, 2004.*
Caro, E. et al, "Application of molecularly imprinted polymers to solid-phase extraction of compounds from enviromental and biological samples" TRAC Trends in Analytical Chemistry, Elsevier, Amsterdam, NL, vol. 25, No. 2, Feb. 1, 2006.*

(Continued)

*Primary Examiner* — Michele L Jacobson
*Assistant Examiner* — Subbalakshmi Prakash
(74) *Attorney, Agent, or Firm* — Cantor Colburn LLP

(57) ABSTRACT

A method for extracting a polycyclic aromatic hydrocarbon from a material such as tobacco or tobacco extracts or other materials comprises treating the material with a molecularly imprinted polymer selective for the hydrocarbon in the presence of a low polarity medium.

17 Claims, 5 Drawing Sheets

Naphthalene

Acenaphthene

Anthracene

Phenanthrene

Pyrene

Benzo[a]pyrene

Chrysene

Fluoranthene

(56) References Cited

PUBLICATIONS

He, C. et al., "Application of molecularly imprinted polymers to solid-phase extraction of analytes from real samples," J. Biochem. Biophys. Methods, vol. 70, 2007, pp. 133-150.*

Krupadam, R. J. et al., "Benzo (alpha) pyrene imprinted polyacrylate nanosufaces: Adsorption and binding characteristics," Sensors and Actuators, vol. 124, 2007, pp. 444-451.*

Baggiani, C., "Molecular recognition of polycyclic aromatic hydrocarbons by pyrene-imprinted microspheres," Analytical and Bioanalytical Chemistry, vol. 389, Sep. 2007, pp. 413-422.*

Dickert, F. L. et al. "Molecularly Imprinted Sensor Layers for the Detection of Polycyclicaromatic Hydrocarbons in Water," Analytical Chemistry, American Chemical Society, Columbus, US, vol. 71, No. 20, Oct. 15, 1999.

Baggiani, C. et al., "Solid phase extraction of food contaminants using molecular imprinted polymers", Analytica Chimca Acta, Elsevier, Amsterdam, NL, vol. 591, No. 1, Apr. 22, 2007.

He, C. et al., "Application of molecularly imprinted polymers to solid-phase extraction of analytes from real samples," J. Biochem. Biophys. Methods, vol. 70, 2007, pp. 133-150.

Krupadam, R. J. et al., "Benzo (alpha) pyrene imprinted polyacrylate nanosufaces: Adsorption and binding characteristics," Senors and Actuators, vol. 124, 2007, pp. 444-451.

International Search Report and Written Opinion corresponding to PCT/GB2009/050740 mailed Oct. 2, 2009.

International Preliminary Report on Patentability corresponding to PCT/GB2009/050740 mailed Oct. 1, 2010.

Liu, Ying, et al. "Molecularly Imprinted Solid-Phase Extraction Sorbent for Removal of Nicotine from Tobacco Smoke." Analytical Letters, vol. 36, No. 8, pp. 1631-1645. 2003.

\* cited by examiner

Naphthalene

Acenaphthene

Anthracene

Phenanthrene

Pyrene

Benzo[a]pyrene

Chrysene

Fluoranthene

Capacity factor (k') of B[a]P on MIP column (4.6 x 150 mm)

Capacity factor (k') of B[a]P on MIP column (4.6 x 150 mm)

% Cyclohexane in EtOAc (15 % DCM in acetonitrile)

METHOD FOR REMOVING POLYCYCLIC AROMATIC HYDROCARBONS

CLAIM FOR PRIORITY

This application is a National Stage Entry entitled to and hereby claims priority under 35 U.S.C. §§365 and 371 to corresponding PCT Application No. PCT/GB2009/050740, filed Jun. 26, 2009, which in turn claims priority to European Patent Application Ser. No. EP 08159224.8, filed Jun. 27, 2008. The entire contents of the aforementioned applications are herein expressly incorporated by reference.

FIELD OF THE INVENTION

This invention relates to methods for extraction of polycyclic aromatic hydrocarbons.

BACKGROUND OF THE INVENTION

The chemical structures of some common polycyclic aromatic hydrocarbons are shown in FIG. 1. Polycyclic aromatic hydrocarbons (PAHs) may be formed when organic materials are heated and are sometimes found in materials that are intended for human consumption such as smoked food, fried food or tobacco products. Since many polycyclic aromatic hydrocarbons are known or suspected to be carcinogenic, it can be desirable to remove them from such materials. Benzo[a]pyrene is a typical polycyclic aromatic hydrocarbon and is known to be carcinogenic.

In some processes for removing polycyclic aromatic hydrocarbons, the polycyclic aromatic hydrocarbons first need to be extracted from a material in which they are present using an extraction medium and thereafter removed from the extraction medium. The extraction medium may extract other constituents of the material, and it may be desired to return these other constituents to the material and to remove the extraction medium, so that losses of the other extracted constituents are minimized. In such processes, it is required that polycyclic aromatic hydrocarbons be selectively removed from the extraction medium, e.g. with a selective adsorbent.

There are also situations where polycyclic aromatic hydrocarbons are dissolved in liquids and need to be removed therefrom. For example it may be desired to remove polycyclic aromatic hydrocarbons from contaminated vegetable or animal oils or essential oils.

In other situation, the purpose of the extraction may be analytical, in order to quantify the levels of polycyclic aromatic hydrocarbons in a material. In some analytical methods, the polycyclic aromatic hydrocarbons are first extracted from the material using an extraction medium and then adsorbed to an adsorbent. The polycyclic aromatic hydrocarbons can then be released from the adsorbent with an elution solvent and quantified. Sometimes, one or more washing steps are employed before the polycyclic aromatic hydrocarbons are released to selectively release other bound compounds. In such methods, it is desirable that the adsorbent is selective in order to eliminate other constituents that may distort or disturb the analysis.

Molecularly imprinted polymers (MIPs) are a class of selective adsorbents. Molecularly imprinted polymers are polymers that are prepared in the presence of a template molecule leading to the formation of sites that are complementary to the template and can selectively bind the template and other functionally related molecules. However, hitherto, MIPs have not performed well in the extraction of polycyclic aromatic hydrocarbons.

SUMMARY OF THE PRESENT INVENTION

The present invention is based upon the discovery that molecularly imprinted polymers selective for polycyclic aromatic hydrocarbons perform surprisingly well where the hydrocarbon is contacted with the molecularly imprinted polymer in the presence of a medium of low polarity.

Accordingly, the present invention provides a method for removing at least one polycyclic aromatic hydrocarbon which method includes contacting the hydrocarbon with a molecularly imprinted polymer selective for the hydrocarbon in the presence of a low polarity medium.

The preferred media used in the invention are low polarity, or have no significantly polarity, in that they have dielectric constants of 8 or less, such as from 1 to 8, such as from 1 to 6, such as 1 to 4, and such as 1 to 2.5. Desirably the dielectric constant of the medium is less than 4, and most advantageously less than 2.5. For example supercritical carbon dioxide, which has a dielectric constant of 1-1.8, depending on the pressure, is preferred in some applications of the invention.

While not wishing to be limited by any theory, we believe that solvents with low polarity are better suited for the extraction of polycyclic aromatic hydrocarbons, because polycyclic aromatic hydrocarbons are themselves of very low polarity. Additionally, extraction of polycyclic aromatic hydrocarbons from complex mixtures of organic products such as food and plant materials with low polarity solvents generally reduces the number of other compounds extracted therefrom, because such mixtures tend to contain more polar constituents, such as carbohydrates and proteins, which are less soluble in low polarity media than low-polarity constituents.

One application of the present invention is in removal of polycyclic aromatic hydrocarbons from smoking material or from material derived from smoking material, for example extracts thereof. The smoking material may be tobacco, a non-tobacco smoking material, or a blend of tobacco and non-tobacco smoking material. Examples of non-tobacco smoking materials are dried and cured vegetable material, including fruit materials, and synthetic smoking materials such as may be produced from alginates and an aerosol-generating substance such as ethylene glycol. Where the smoking material comprises tobacco, the tobacco may of any suitable type, or a blend thereof, including air-cured, fire-cured, flue-cured, or sun-cured lamina or stem, and may have been processed using any appropriate process. For example, the tobacco may be cut, shredded, expanded or reconstituted.

Accordingly the invention specifically provides a method for removing at least one polycyclic aromatic hydrocarbon from a smoking material or a derivative thereof which method includes contacting the smoking material or derivative with a molecularly imprinted polymer selective for the hydrocarbon the presence of a low polarity medium The present invention is also applicable to the removal of polycyclic aromatic compounds from materials other than smoking materials or derivatives thereof, for example non-tobacco plant material and extracts thereof, food materials and flavoring agents, in particular vegetable oils, animal oils, essential oils, a liquid smoke, tar extracts or any mixture thereof.

In the preferred process of the present invention a material containing a polycyclic aromatic hydrocarbon is contacted with an extraction medium whereupon the hydrocarbons and other soluble or partly soluble constituent(s) is/are substantially dissolved in the extraction medium, and the method further comprises the step of returning the other constituent(s) to the material.

The extraction medium may be a solvent, solvent mixture, supercritical fluid or a mixture of a supercritical fluid and one or more solvents. Where the extraction medium is low polarity, the hydrocarbon is extracted from the medium by contacting the medium with the molecularly imprinted polymer.

The invention therefore specifically provides a method of extracting a polycyclic aromatic hydrocarbon from a material containing the hydrocarbon, wherein the material is contacted with a low polarity extraction medium to extract the hydrocarbon from the material, and the extraction medium containing the hydrocarbon is contacted with the molecularly imprinted polymer to remove the hydrocarbon Where the extraction medium is polar, the polarity of the extraction medium should be reduced, preferably to a dielectric constant of less than about 8, for example by mixing the extraction medium with a less polar solvent, before it is contacted with the molecularly imprinted polymer to remove the hydrocarbon. The invention therefore specifically includes a method of extracting a polycyclic aromatic hydrocarbon from a material comprising the steps of contacting a material containing the polycyclic aromatic hydrocarbon with an extraction medium to extract the hydrocarbon from the material, decreasing the polarity of extraction medium to a dielectric constant of less than about 8, and contacting the extraction medium containing the hydrocarbon with the molecularly imprinted polymer to remove the hydrocarbon

SHORT DESCRIPTION OF THE DRAWINGS

FIG. 1 illustrates examples of common polycyclic aromatic hydrocarbons.

FIG. 2 schematically illustrates a re-circulating setup for removal of polycyclic aromatic hydrocarbons from tobacco or other materials.

DETAILED DESCRIPTION OF THE PRESENT INVENTION

Figure 1:
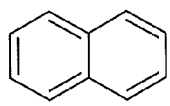
Figure 1:
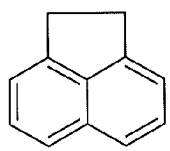
Figure 1:
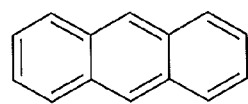
Figure 1:
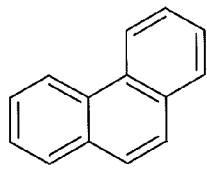
Figure 1:
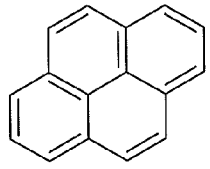
Figure 1:
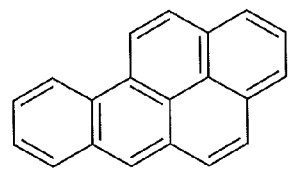
Figure 1:
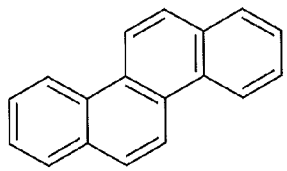
Figure 1:
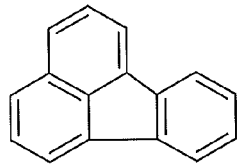

The present invention relates to a method for removing polycyclic aromatic hydrocarbons from various materials, such as smoking materials, food materials, plant materials, plant extracts and flavouring agents. The invention is particularly, but not exclusively, suitable for performance in connection with any of the following, namely: smoking materials, food materials, including any substance that can be eaten or drunk by an animal, including humans, for nutrition or pleasure; flavouring agents, including agents that are typically added to an material to add aroma and/or taste, such as liquid smoke which may be obtained by burning wood and extracting the formed smoke with an extraction medium; plant materials, which may originate from any part of a plant, such as flowers, stems, leaves or roots; any vegetable oils, in particular triglyceride oils originating from one or more vegetables and optionally comprising additional constituents; any animal oils, in particular triglyceride oils originating from one or more animals and optionally comprising additional constituents; and essential oils, for example mixtures of volatile aroma compounds obtained from plants, whether by steam distillation or otherwise.

The invention is preferably used in connection with the extraction of polycyclic aromatic hydrocarbons with at least two fused aromatic rings. In some embodiments the polycyclic aromatic hydrocarbons have four or more aromatic rings.

In one embodiment of the invention, the method involves contacting, e.g. extracting, a solid or liquid material with a low-polarity extraction medium and contacting the extract with a molecularly imprinted polymer, having at least one aromatic ring, selective for a polycyclic aromatic hydrocarbon. The extract is optionally returned to the material and the extraction medium removed.

In one embodiment of the invention, the material is a liquid, such as a vegetable oil, an animal oil or an essential oil or mixtures thereof, that is optionally diluted with a low polarity medium, forming a low polarity mixture and then contacted with a molecularly imprinted polymer having at least one aromatic ring. The low polarity medium may be used to reduce the viscosity of the liquid, allowing it to flow through a packed column of molecularly imprinted polymer particles. The low polarity medium is then optionally removed. Whenever the material is not diluted with a low polarity medium the material itself forms the low polarity mixture.

In some of the embodiments of the invention, the purpose for removing the polycyclic aromatic hydrocarbons is to quantify their levels.

In one embodiment of the present invention, a material, such as a smoking material or an extract thereof, food material, flavouring agent or plant material is extracted with a low polarity extraction medium. In some embodiment the material is dissolved in the low polarity extraction medium. The extract and/or the low polarity medium containing the material is contacted with a molecularly imprinted polymer and the polycyclic aromatic hydrocarbons are adsorbed on the molecularly imprinted polymer. The extract is then optionally returned to the material. This may be done in order to return other extracted compounds to the material. The molecularly imprinted polymer is optionally washed with one or more solvents or solvent mixtures or supercritical fluids which are then returned to the material. The low polarity extraction medium and the washing solvents or supercritical fluids are then optionally removed from the material.

In one embodiment the polycyclic aromatic hydrocarbons or products containing polycyclic aromatic hydrocarbons are dissolved in liquids and the polycyclic aromatic hydrocarbons need to be removed therefrom. For example it may be desired to remove polycyclic aromatic hydrocarbons from vegetable or animal oils, essential oils, waxes, cooking fats, such as butter, margarine, coconut fat etc.

In some aspects of the invention, the material is one or more food material(s), one or more flavouring agent(s) or one or more plant material(s) or a material derived therefrom, such as an extract. In others, the material is a smoking material or an extract thereof.

In some embodiments of the invention, the low polarity extraction medium is selected from a group consisting of supercritical fluids such as supercritical carbon dioxide, a hydrocarbon, such as cyclohexane, heptane or toluene, ethyl acetate, diethyl ether, vegetable or animal oils or mixtures thereof.

In some embodiments of the present invention, the polycyclic aromatic hydrocarbons are released from the molecularly imprinted polymer with a regeneration solvent allowing the molecularly imprinted polymer to be reused.

In one embodiment of the present invention the low polarity medium may be surrounded by a polar or low polarity medium.

Figure 2:
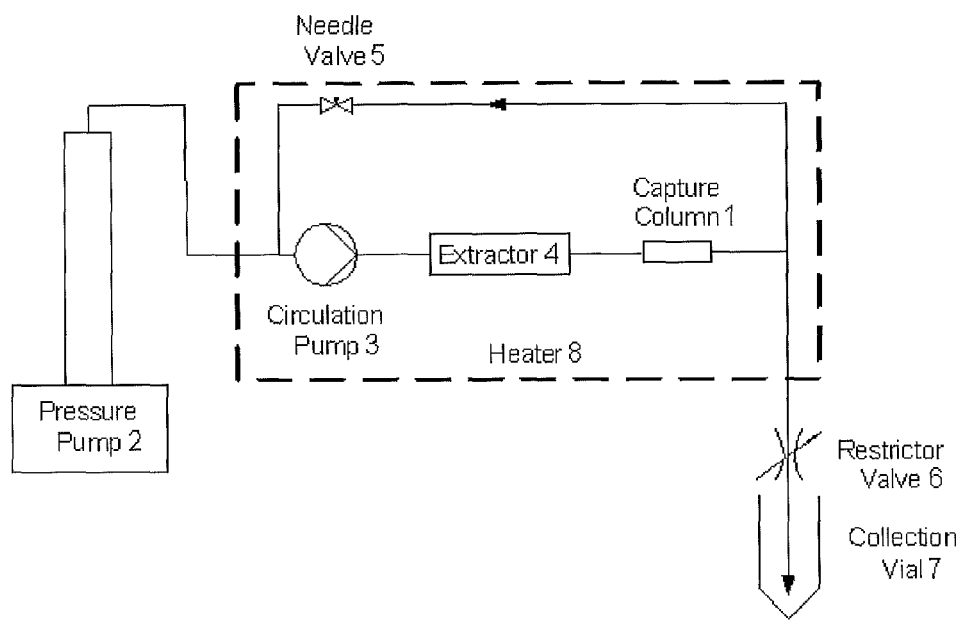

In one embodiment of the present invention, a sample of tobacco or other smoking material, or an extract thereof, is extracted with supercritical carbon dioxide and the extract is contacted with a molecularly imprinted polymer that removes the polycyclic aromatic hydrocarbons from the supercritical extract. In one embodiment of the invention, the extract is then returned to the tobacco sample for one or more additional extraction cycle(s). In one embodiment of the invention, the extraction cycle is repeated until the levels of polycyclic aromatic hydrocarbons have been reduced to a desired level. The desired level may be dependent on the intended use of the tobacco. FIG. 2 schematically illustrates a setup for this process.

FIG. 2 illustrates schematically one example of equipment for removal of polycyclic aromatic hydrocarbons from tobacco or other materials. The polycyclic aromatic hydrocarbons are trapped on a capture column (1) packed with a molecularly imprinted polymer using supercritical medium. The equipment comprises a pressure pump (2), a re-circulation pump (3), an extraction cell (extractor) (4), such as a semi preparative HPLC (high performance liquid chromatography) column (10×150 mm) packed with the material, a capture column (1) (4.6×50 mm) packed with a MIP, a needle valve (5) enabling adjustment of back pressure upon recirculation of the treated material and a restrictor valve (6) intended to release the pressure after extraction. The outflow from the restrictor may be passed through a collection vial (7) filled with suitable solvent for potential capture of extracted constituents. Optionally a heater (8) may be present.

In some aspects of the present invention, the polycyclic aromatic hydrocarbons are released from the molecularly imprinted polymer with a regeneration solvent and the molecularly imprinted polymer is reused.

In one embodiment of the present invention, a liquid or solid material is extracted with a low polarity extraction medium. The extract is contacted with a molecularly imprinted polymer and the polycyclic aromatic hydrocarbons are adsorbed on the molecularly imprinted polymer. The molecularly imprinted polymer is optionally washed with one or more solvents or solvent mixtures, and the polycyclic aromatic hydrocarbons are released from the molecularly imprinted polymer with an elution solvent and may be quantified. In some embodiments of the invention, the material is one or more food material(s), one or more flavouring agent(s) or one or more plant material(s).

In some aspects of the invention, the low polarity extraction medium is supercritical fluid such as supercritical carbon dioxide, a hydrocarbon such as cyclohexane, heptane or toluene, ethyl acetate, diethyl ether, vegetable or animal oils or mixtures thereof.

In one embodiment of the present invention, a material is optionally diluted with or dissolved in a low polarity organic solvent and contacted with a molecularly imprinted polymer. The molecularly imprinted polymer is removed and optionally washed with one or more solvents, solvent mixtures or supercritical fluids that are returned to the material and optionally removed. A material with reduced levels or polycyclic aromatic hydrocarbons is obtained.

In some embodiments of the invention, the material is a liquid material.

In some embodiments of the invention, the liquid material is a vegetable oil or animal oil, an essential oil, liquid smoke or liquid extract of a smoking material. In some embodiments of the invention, the low polarity organic solvent is a hydrocarbon, such as cyclohexane, heptane or toluene, ethyl acetate or diethyl ether. In some embodiments of the invention, the molecularly imprinted polymer may be packed in a column. In some embodiments of the present invention, the polycyclic aromatic hydrocarbons are released from the molecularly imprinted polymer with a regeneration solvent allowing the molecularly imprinted polymer to be reused.

In one embodiment of the present invention, a vegetable or animal oil, essential oil, liquid smoke or liquid extract of a smoking material is optionally diluted with a low polarity organic solvent. The optionally diluted oil is contacted with a molecularly imprinted polymer and the polycyclic aromatic hydrocarbons are adsorbed on the molecularly imprinted polymer. The molecularly imprinted polymer is optionally washed with one or more solvents or solvent mixtures, and the polycyclic aromatic hydrocarbons are released from the molecularly imprinted polymer with an elution solvent and may be quantified. In some embodiments of the invention, the low polarity organic solvent is a hydrocarbon such as cyclohexane, heptane or toluene, ethyl acetate or di-ethyl ether.

The aforementioned molecularly imprinted polymer is prepared with at least one aromatic monomer.

Suitable non-limiting examples of functional monomers are styrene, 1-vinylnaphthalene, 2-vinylnaphthalene, 2,3,4,5,6-pentafluorostyrene, 3-nitrostyrene, 2-, 3-, or 4-vinylbiphenyl, 3,5-bis(trifluoromethyl)styrene, 4-acetoxystyrene, a N-methyl-2-vinylpyridinium salt, a N-methyl-3-vinylpyridinium salt, a N-methyl-4-vinylpyridinium salt, 2-vinylpyridine, 4-vinylpyridine, divinylbenzene or derivatives or analogues thereof. The functional monomer may also act as a cross-linking monomer.

Suitable non-limiting examples of cross-linking monomers are ethylene glycol dimethacrylate, trimethylolpropane trimethacrylate and divinylbenzene.

In one embodiment the template is a compound with at least two fused or conjugated aromatic rings. Pyrene may be used as a template in the preparation of the molecularly imprinted polymer, but also other templates, such as napthalene, stilbene, antracene, benzo[a]pyrene acenaphthene, acenaphthylene, anthracene, benz[a]anthracene, benzo[b]fluoranthene, benzo[k]fluoranthene, benzo[ghi]perylene, benzo[a]pyrene, chrysene, dibenz[a,h]anthracene, fluoranthene, fluorene, indeno[1,2,3-cd]pyrene, naphthalene, and phenanthrene may be used. In one embodiment pyrene is used as template. In some embodiments of the invention, the molecularly imprinted polymer is prepared using divinylbenzene and 4-vinylpyridine or analogues or suitable derivatives thereof as monomers.

In some embodiments a porogen, preferably in the form of a solvent, is present in a polymerisation reaction and leads to the formation of a porous polymer. Suitable porogens are known to a person skilled in the art and non-limiting examples thereof are ethyl acetate, toluene, benzyl alcohol, cyclohexane, isopropanol and acetonitrile. In one embodiment ethyl acetate is used. In some embodiment the molecularly imprinted polymer is prepared using divinylbenzene and 4-vinylpyridine as monomers and pyrene as the template. In one embodiment the molecularly imprinted polymer is prepared using divinylbenzene and 4-vinylpyridine as monomers, pyrene as the template and ethyl acetate as porogen. A molecular imprinted polymer similar to the molecularly imprinted polymer in the present invention but prepared with benzo[a]pyrene as the template and dichloromethane as the porogen has been shown to be able to extract benzo[a]pyrene from coffee diluted with methanol (Lai et al, Analytica Chimica Acta 522 (2004) 137-144) and to weakly bind benzo[a]pyrene in dichloromethane. Dichloromethane is a solvent of intermediate polarity. No experiments in more low polarity organic solvents were disclosed.

A comprehensive study of the behaviour of molecularly imprinted polymers with polycyclic aromatic hydrocarbons (Baggiani et al, Anal Bioanal Chem (2007) 389:413-422), discloses that a molecularly imprinted polymer similar to the molecularly imprinted polymer according to the present invention but prepared with chloroform as the porogen has low retention of pyrene in dichloromethane and that the retention gradually increases when increasing amounts of acetonitrile, a high-polarity solvent, was mixed with the dichloromethane. The results were explained by a partition mechanism involving hydrophobic interactions between pyrene and the molecularly imprinted polymer. No experiments in low polarity organic solvents were disclosed. Polycyclic aromatic hydrocarbons being retained in polar solvents and that the retention decreases when the polarity of the solvent decreases so that it is low with solvents of intermediate polarity such as dichloromethane is known. There is no reason to believe that this behavior would change if even more low polarity organic solvents were to be employed. The present inventors have however surprisingly found that molecularly imprinted polymers according to the present invention show good retention properties in low polarity organic solvents such as cyclohexane, heptane and supercritical carbon dioxide or any mixture thereof.

Figure 3:
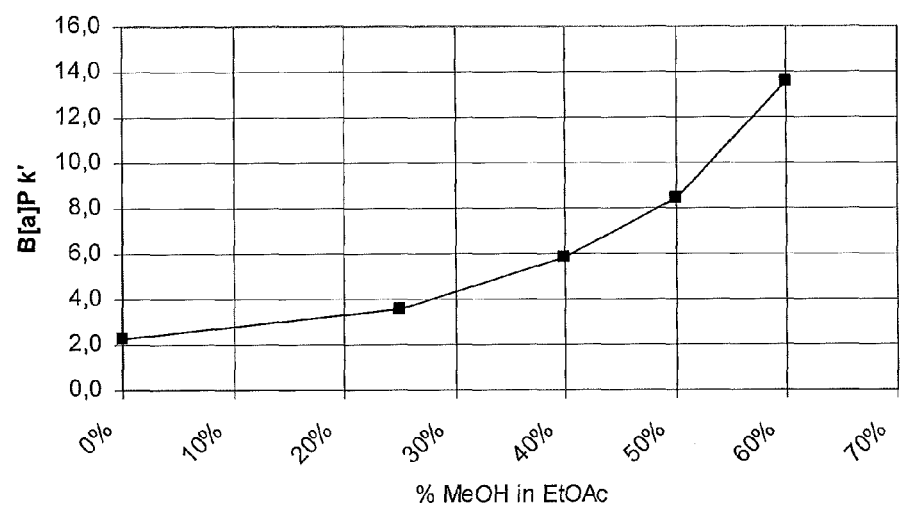
FIG. 3 illustrates the capacity factor k' for benzo[a]pyrene in mixtures of ethyl acetate and methanol with increasing amounts of methanol.
Figure 4:
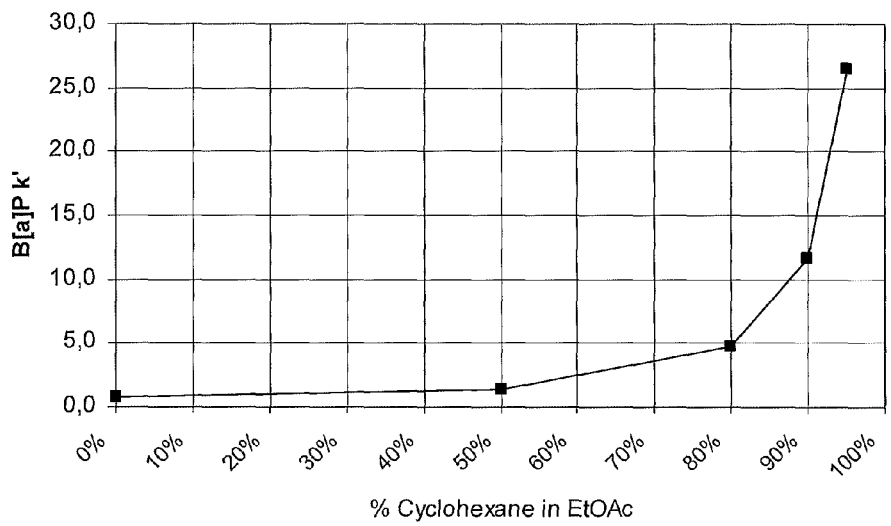
FIG. 4 illustrates the capacity factor k' for benzo[a]pyrene in mixtures of ethyl acetate and cyclohexane with increasing amounts of cyclohexane.

As an illustration, the capacity factor k' was measured in ethyl acetate with increasing concentrations of either methanol or cyclohexane. The capacity factor k' is defined as the difference between the retention volume of a compound and the void volume divided by the void volume in an isocratic chromatographic experiment and is a measure of the retention of a molecule to an adsorbent where a higher capacity factor k' means a stronger binding to the adsorbent. In the case with increasing amounts of the polar solvent methanol, the capacity factor k' increases with the amount of methanol as would be predicted based on the information disclosed by Baggiani et al, as is indicated in FIG. 3. In the case with the low polarity organic solvent cyclohexane, the capacity factor k' increases with the amount of cyclohexane, as indicated in FIG. 4. This is highly surprising since the present inventor anticipated that the addition of a low polarity organic solvent would be expected to lead to a lower capacity factor k'. In fact, it appears that the capacity factor k' is close to a minimum value in pure ethyl acetate as it increases if the polarity of the solvent is increased or decreased respectively.

A common measure of the polarity of a medium is the dielectric constant where a high dielectric constant indicates a polar medium and a low dielectric constant indicates a low polarity medium. As will be known to a person skilled in the art, polar media have high dielectric constants, for example above 10.

The preferred low polarity media used in the invention have a low dielectric constant, e.g. in the range 1 to about 8. The low polarity mixtures formed during the process of the invention containing a polycyclic aromatic hydrocarbon and an extraction medium preferably have dielectric constants in the same range.

A polar medium is a medium with a high dielectric constant, preferably higher than about 10 and a low polarity medium is a medium with a low dielectric constant, preferably less than about 8. The following list summarizes the capacity factors that have been obtained for benzo[a]pyrene in solvents of different polarities with the molecularly imprinted polymer:

Ethyl acetate (dielectric constant 6.08*): k'=3.0
Diethyl ether (dielectric constant 4.27*): k'=6.4
Cyclohexane (dielectric constant 2.02*): k'>50
*obtained from CRC, Handbook of Chemistry and Physics, $80^{th}$ Ed.

For comparison, Baggiani reports a capacity factor k' in dichloromethane (dielectric constant 8.93*) of approximately 0.2. The retention found by the inventors is clearly much higher than would be expected based on the predicted capacity factor k' of 0.2 or less.

Without being bound to theories, the present inventors speculate that the good retention is due to charge-transfer interactions between the electron-rich pyrene molecules and the electron-deficient pyridine rings in the polymer. The invention is not limited to polymers containing pyridine rings and polymers containing other aromatic groups including but not limited to phenyl, napthyl, pentafluorophenyl, 3-nitrophenyl, biphenyl, 3,5-bis(trifluoromethyl)phenyl, 4-acetoxyphenyl, pyridine, N-methylpyridinium or derivatives or analogues thereof are also efficacious.

Figure 5:
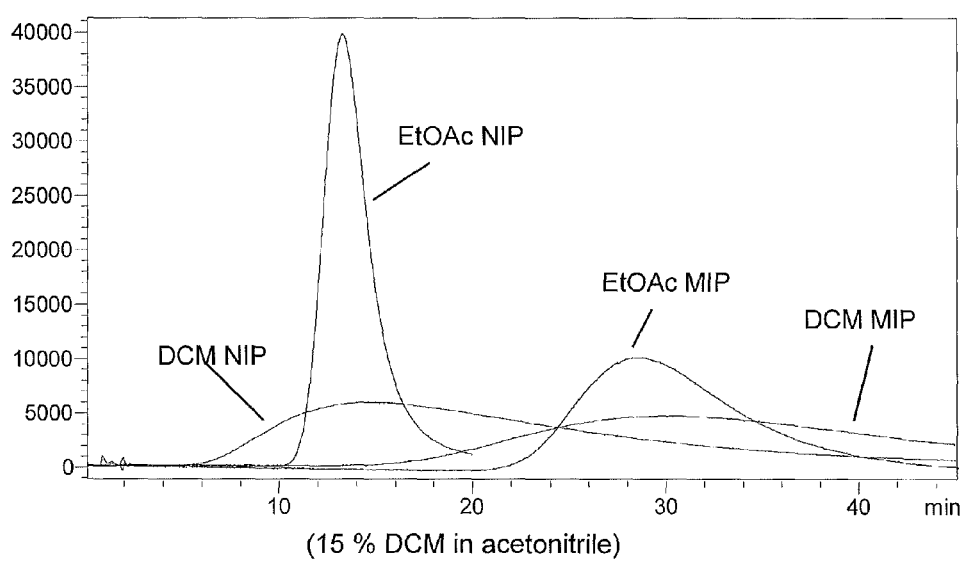
FIG. 5 illustrates the difference in peak shape in a chromatographic experiment when dichloromethane and ethyl acetate are used as porogens in the preparation of the molecularly imprinted polymer.

In the present invention, ethyl acetate is used as the porogen instead of dichloromethane and chloroform. We have found ethyl acetate to be a better porogen since it gives more homogenous adsorption behaviour as evidenced in chromatographic experiments with the molecularly imprinted polymer (FIG. 5), also other porogens, such as those described herein, may result in similar properties.

In some aspects of the present invention the molecularly imprinted polymer may be regenerated by washing with a solvent where the polycyclic aromatic hydrocarbon have a low capacity factor k'. Such solvent may be solvents having intermediate polarity, such as a dielectric constant from 8 to 10, such as dichloromethane (dielectric constant 8.9). Such intermediate polarity intervals may be obtained by mixing solvents having a low polarity and a solvent having a higher polarity. Also other regeneration methods may be used. Regeneration of the molecularly imprinted polymer may be suitable to used in large scale process.

As used in the present specification wherever an interval is present such as "above 60%" it means any interval between 60 and 100%, as well as any subinterval thereof, e.g. 75.1-88.3%, 90.2-99.3 etc; "less than 10" means that any interval up to 10, as well as any subinterval thereof, e.g. 1.1-7.9.

EXAMPLES

The following examples are illustrative examples only and should not in any way be interpreted as limiting to the invention.

Example 1

In a typical procedure, a prepolymerisation mixture was prepared by adding the template molecule pyrene (200 mg, 1 mmol), the functional monomer 4-vinylpyridine (0.84 g, 8 mmol), the crosslinker divinylbenzene (5.2 g, 40 mmol), the initiator ABDV (azo-N,N'-bis divaleronitrile) (0.1 g) and the porogen ethyl acetate (18 ml) to a glass bottle. The mixture was sonicated until all components were dissolved and the solution transferred to a reaction bottle together with a pre-made 3% aqueous polyvinylalcohol solution (80 ml). The mixture was stirred for some minutes followed by raising the temperature to 46° C. and after 4-6 h to 65° C. The process was maintained over night. The formed polymer was filtered off and washed with water followed by methanol. The collected material was then sieved through 20-90 micron sieve and washed with ethyl acetate in soxhlet apparatus for 24 h to give 4.5 g white polymer.

Example 2

Comparative Example

The experimental protocol used in Example 1 was followed, but dichloromethane (DCM) was used as porogen. The collected material was then sieved through 20-90 micron sieve and washed with ethyl acetate in soxhlet apparatus for 24 h to give 4.5 g white polymer.

Example 3

HPLC tests with the polymers prepared in example 1 and 2 as well as the corresponding non-imprinted polymers (NIP), i.e. without the template pyrene. The polymers were packed in separate 4.6×150 mm HPLC columns. Benzo[a]pyrene (B[a]P) standard was injected into a mobile phase (15% DCM in acetonitrile) and the response was monitored with a fluorescence detector. The resulting chromatograms were overlayed and are presented in FIG. 5.

As can be seen the chromatographic behavior for the MIP and NIP using ethyl acetate (EtOAc) are by far superior to the polymers using dichloromethane (DCM) as porogen. The apparent resolution for the NIP/MIP pair is 1.3 for the EtOAc polymers while it is only 0.3 for the DCM polymers. The narrower and more symmetrical peaks for the EtOAc MIP (Example 1) indicate a more homogenous adsorption to the MIP.

Example 4

The experimental protocol from example 1 was followed, but styrene (0.84 g, 8 mmol) was used as functional monomer.

Example 5

The experimental protocol from example 1 was followed, but EDMA (ethylene glycol dimethacrylate) (8.0 g, 40 mmol) was used as crosslinker.

Example 6

Figure 6:
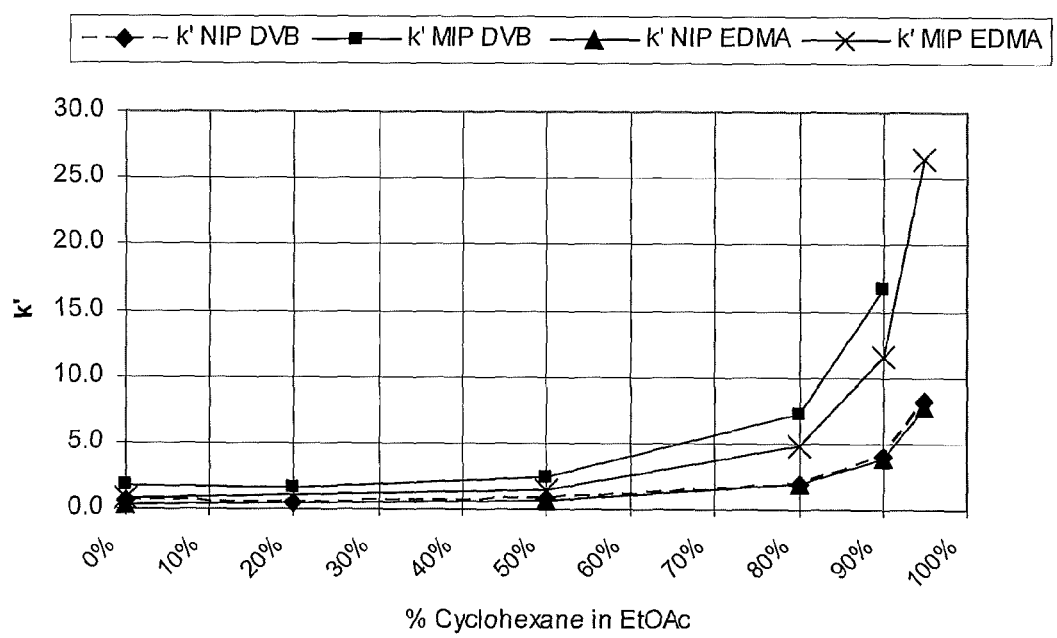
FIG. 6 illustrates the capacity factor k' for imprinted and non-imprinted polymers in mixtures of ethyl acetate and cyclohexane with increasing amount of cyclohexane.

The capacity factor (k') for Benzo[a]pyrene in 4.6×150 mm HPLC columns packed with the polymers described in example 1, and 5 and their corresponding NIPs (non-imprinted polymer) respectively were determined in isocratic runs with mobile phase with increasing amount of cyclohexane in EtOAc. The resulting k' values are presented in FIG. 6. Surprisingly the retention of Benzo[a]pyrene increases dramatically when the solvent is more low polarity. As can be seen the retention increases most for the imprinted DVB polymer compared to the EDMA polymer. The effect is not that strong for the NIPs which results in an increase in the imprinting factor ($k'_{MIP}/k'_{NIP}$) with decreasing polarity. Consequently the specific selectivity towards PAH increases as the amount of cyclohexane increases.

Example 7

Tobacco material containing benzo[a]pyrene was extracted using cyclohexane until the benzo[a]pyrene was extracted from the material. The cyclohexane extract was passed through a 3 ml SPE cartridge packed with 50 mg MIP. The benzo[a]pyrene was thus selectively removed from the tobacco extract and the remaining extracted constituents could e.g. be transferred back to the tobacco in order to restore the characteristics of the original tobacco.

Figure 7:
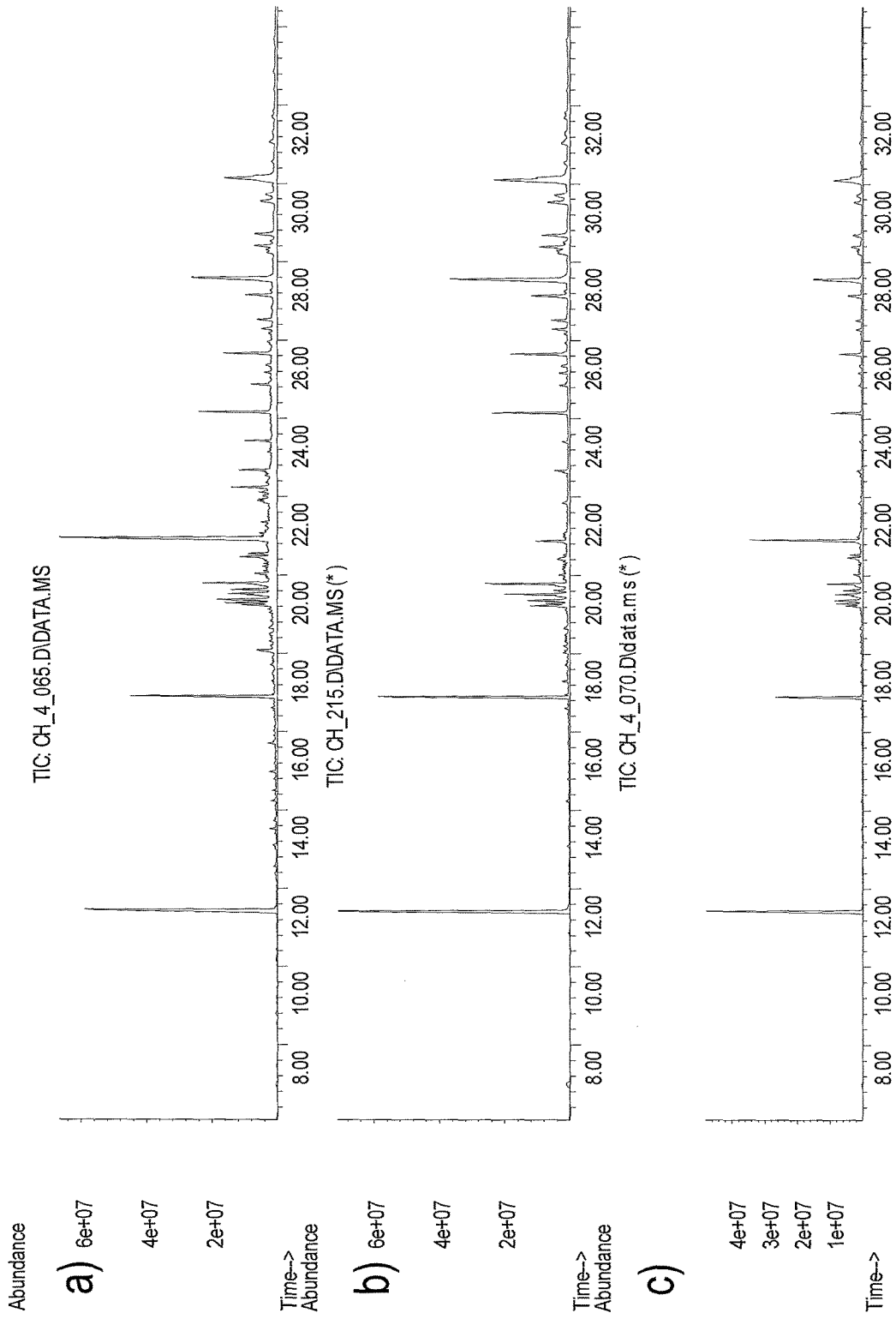
FIG. 7 illustrates the GC-MS full scan fingerprint of tobacco cyclohexane extract where a) is the untreated extract, b) the extract after passing through the MIP based on EDMA polymer, and c) the extract after passing the MIP based on DVB polymer.

In this way the benzo[a]pyrene concentration was reduced by more than 97% in the extract, without significant altering the GC-MS full scan fingerprint as shown in FIG. 7.

Example 8

Benzo[a]pyrene-containing tobacco was extracted by a supercritical fluid extraction (SFE) setup as shown in FIG. 2, using supercritical $CO_2$ ($scCO_2$) under conditions optimized for extraction of benzo[a]pyrene from the tobacco. During the extraction the $scCO_2$ was re-circluated in the system by a recirculation pump, and thus the extract was continuously passing a 4.6×50 mm column packed with MIP which selectively removed benzo[a]pyrene from the extract while other extracted constituents were re-circulated to the tobacco.

Example 9

Extraction was performed according to example 8 but without recirculation, i.e. the $scCO_2$ extract passed through the restrictor valve and was collected in a suitable solvent such as ethyl acetate. As in example 8, the benzo[a]pyrene was selectively trapped by the MIP, while the other constituents could e.g. be transferred back to the tobacco by pouring or spraying the collection solvent on to the tobacco and allowing the solvent to evaporate.

In this way it was shown that the MIP could reduce the benzo[a]pyrene levels by more than 97% without altering the nicotine levels.

Example 10

Due to the efficient trapping in low polarity extracts the MIP could efficiently be used as a clean up step for analytical extractions of benzo[a]pyrene and other large PAH, such as PAH's comprising 4 or more aromatic rings. After the procedure described in example 7 the PAH were eluted using ethyl acetate or DCM and quantified by GC-MS and the level of benzo[a]pyrene in the tobacco could thus be calculated.

Example 11

The MIP was used to quantify the amount of benzo[a]pyrene and other large PAH in liquid smoke, both water based and oil based. The liquid smoke was loaded on to a SPE cartridge packed with MIP and a series of washing steps were performed using cyclohexane, methanol and water in order to enhance the selectivity and remove interfering compounds. The PAHs were eluted with ethyl acetate. The ethyl acetate was evaporated and the samples were re-constituted in a small volume of solvent and PAHs were quantified by GC-MS.

Example 12

The MIP according to Example 1, was used to recover benzo[a]pyrene and benzo[a]anthracene (BaA) from oil-based liquid smoke. A sample of 1 ml of the oil-based liquid smoke containing BaP-d12 and BaA-d12 was added to a SPE column containing a MIP (75 mg) according to Example 1. The SPE column was washed with cyclohexane and thereafter the sample was eluted with ethyl acetate (about 3×1 ml). The sample was evaporated and redissolved in cyclohexane/ethylacetate (50/50, 1000 µl) and analyzed by GC-MS. More than 80% of the BaP and BaA was recovered. Optionally an extraction step such as liquid/liquid extraction was used and comparative results were obtained.

Example 13

The MIP was used to quantify the level of benzo[a]pyrene and other large PAH in vegetable and animal oils. The method in Example 11 was used.

Example 14

The MIP according to Example 1 was used to recover benzo[a]pyrene and other large PAH from olive oil. A sample of 0.5 g of olive oil and PAHs (2 ng/g of each PAH) and chrysene-$d_{12}$ (internal standard) was prepared. The sample was diluted with cyclohexane (0.5 ml). A SPE column was conditioned with cyclohexane (about 1 ml), and the sample was added. Thereafter the SPE column was washed with cyclohexane (about 1 ml), and the sample eluted with ethyl acetate (about 3 ml).
The sample was evaporated to dryness and reconstituted into ethyl acetate and analyzed by GC-MS. The following recoveries of the added PAHs were obtained by conventional analytical methods: Acenapthene 70%, Anthracene 28%, Fluoranthene 48%, Benzo(a)anthracene 65%, Chrysene 70%, Benzo(b)fluoranthene 82%, Benzo(k)fluoranthene 84%, Benzo[a]pyrene 87%, Indeno(1,2,3-cd)pyrene 95%, Dibenzo(a,h)anthracene 82%, Benzo(g,h,i)perylene 87%.

Example 15

The MIP was used to quantify the level of benzo[a]pyrene and other PAHs in low polarity extracts, such as cyclohexane or heptane and are thus an efficient cleanup step for any liquid-liquid extraction (LLE), or liquid-solid extraction (LSE) using such solvents in a similar procedure as described in example 11, 12 and 13.

Example 16

A system as described in example 9, was used to quantify benzo[a]pyrene and other large PAH, such as PAHs comprising 4 or more aromatic rings, in a variety of solid samples by first extracting the PAHs from the sample matrix using scCO$_2$ and then passing it through the MIP where the large PAHs were selectively trapped, and then eluted by ethyl acetate of DCM, followed by quantification by suitable analytical equipment for quantification of the PAH. The concentration of PAH in the original sample may then be calculated.

Example 17

Automated systems for accelerated solvent extraction using heated and pressurized solvents was modified with a MIP trap; or the MIP could be placed in the extraction cell for selective capture of large PAHs when extracting samples with low polarity solvent such as cyclohexane or heptane. The PAHs was then eluted and analyzed as described in example 16.

The invention claimed is:
1. A method for removing at least one polycyclic aromatic hydrocarbon from a smoking material or a derivative thereof, comprising:
   contacting the material or derivative thereof with a molecularly imprinted polymer selective for the hydrocarbon in the presence of a low polarity medium having a dielectric constant less than 8.
2. A method for removing at least one polycyclic aromatic hydrocarbon from a material other than a smoking material, or from a derivative thereof, comprising:
   contacting the material or derivative thereof with a molecularly imprinted polymer selective for the at least one hydrocarbon in the presence of a low polarity medium having a dielectric constant less than 8,
      wherein the material other than a smoking material, or a derivative thereof is selected from a plant material, a plant extract, a food material or a flavoring agent, and
      wherein said plant material, plant extract, food material or flavoring agent is selected from a group consisting of a vegetable oil, an animal oil, an essential oil, a liquid smoke, an extract of tar, or any mixture thereof.
3. The method according to claim 1, further comprising:
   decreasing the polarity of the material containing the at least one polycyclic aromatic hydrocarbon to a dielectric constant less than 8; and
   contacting the material containing the at least one hydrocarbon with the molecularly imprinted polymer to remove the at least one hydrocarbon.
4. The method according to claim 1 further comprising:
   dissolving the material containing the at least one polycyclic aromatic hydrocarbon in the low polarity medium having a dielectric constant less than 8; and
   contacting the medium containing the material containing the at least one polycyclic aromatic hydrocarbon with the molecularly imprinted polymer to remove the at least one hydrocarbon.
5. The method according to claim 1 further comprising:
   contacting the material containing the at least one polycyclic aromatic hydrocarbon with a low polarity extraction medium having a dielectric constant less than 8 to extract the at least one hydrocarbon from the material; and
   contacting the extraction medium containing the at least one hydrocarbon with the molecularly imprinted polymer to remove the at least one hydrocarbon.

6. A method according to claim 1, further comprising:
contacting the material containing the at least one polycyclic aromatic hydrocarbon with an extraction medium to extract the at least one hydrocarbon from the material,
decreasing the polarity of the extraction medium to a dielectric constant less than 8; and
contacting the extraction medium containing the at least one hydrocarbon with the molecularly imprinted polymer to remove the at least one hydrocarbon.

7. The method according to claim 1, wherein the low polarity medium extracts the at least one polycyclic aromatic hydrocarbon together with at least one other constituent of the material, and the method further comprises returning the extracted at least one other constituent to the material.

8. The method according to claim 1, wherein said low polarity medium is selected from a group consisting of supercritical fluid, a low polarity organic solvent or any mixture thereof.

9. The method according to claim 8, wherein said supercritical fluid is selected from carbon dioxide or water; and the low polarity organic solvent is selected from cyclohexane, heptane, toluene, ethyl acetate, diethyl ether, vegetable or animal oils or any mixture thereof.

10. The method according to claim 1, wherein said molecularly imprinted polymer is obtained by:
forming a pre-polymerisation mixture from at least one polymerisable aromatic monomer and at least one template;
initiating polymerisation of said at least one monomer;
forming a molecularly imprinted polymer from said polymerisation; and
removing said at least one template from said molecularly imprinted polymer.

11. The method according to claim 10, wherein the monomer is a cross-linking monomer.

12. The method according to claim 10, wherein said at least one aromatic monomer is selected from a group consisting of styrene, 1-vinylnaphthalene, 2-vinylnaphthalene, 2,3,4,5,6-pentafluorostyrene, 3-nitrostyrene, 2-, 3-, or 4-vinylbiphenyl, 3,5-bis(trifluoromethyl)styrene, 4-acetoxystyrene, a N-methyl-2-vinylpyridinium salt, a N-methyl-3-vinylpyridinium salt, a N-methyl-4-vinylpyridinium salt, 2-vinylpyridine, 4-vinylpyridine, divinylbenzene or derivatives thereof.

13. The method according to claim 10, wherein the template is a compound having at least two fused or conjugated aromatic rings.

14. The method according to claim 13, wherein the template is selected from a group consisting of pyrene, napthalene, stilbene, antracene, benzo[a]pyrene acenaphthene, acenaphthylene, anthracene, benz[a]anthracene, benzo[b]fluoranthene, benzo [k]fluoranthene, benzo [g,h,i]perylene, benzo[a]pyrene, chrysene, dibenz[a,h]anthracene, fluoranthene, fluorene, indeno[1,2,3-cd]pyrene, naphthalene, and phenanthrene.

15. The method according to claim 10, wherein the pre-polymerisation mixture includes a porogen.

16. The method according to claim 1, wherein removing the at least one polycyclic aromatic hydrocarbon includes reducing the level of the polycyclic aromatic hydrocarbon by more than 60%, more than 70%, more than 80%, more than 90% or more than 95%.

17. The method according to claim 15, wherein the porogen is ethyl acetate.

* * * * *